United States Patent
Walters et al.

(10) Patent No.: US 11,982,797 B2
(45) Date of Patent: May 14, 2024

(54) ASPECT RATIO MODIFYING IMAGING SYSTEMS AND METHODS

(71) Applicant: Teledyne FLIR Commercial Systems, Inc., Goleta, CA (US)

(72) Inventors: Michael D. Walters, San Jose, CA (US); Alan D. Kathman, Charlotte, NC (US); David Ovrutsky, Charlotte, NC (US)

(73) Assignee: Teledyne FLIR Commercial Systems, Inc., Goleta, CA (US)

( * ) Notice: Subject to any disclaimer, the term of this patent is extended or adjusted under 35 U.S.C. 154(b) by 145 days.

(21) Appl. No.: 17/607,757

(22) PCT Filed: Apr. 17, 2020

(86) PCT No.: PCT/US2020/028857
§ 371 (c)(1),
(2) Date: Oct. 29, 2021

(87) PCT Pub. No.: WO2020/223047
PCT Pub. Date: Nov. 5, 2020

(65) Prior Publication Data
US 2022/0221691 A1   Jul. 14, 2022

Related U.S. Application Data

(60) Provisional application No. 62/841,161, filed on Apr. 30, 2019.

(51) Int. Cl.
*G02B 13/00* (2006.01)
*G02B 13/08* (2006.01)
(Continued)

(52) U.S. Cl.
CPC .......... *G02B 13/008* (2013.01); *G02B 13/08* (2013.01); *G02B 13/22* (2013.01); *H04N 5/33* (2013.01); *H04N 23/55* (2023.01)

(58) Field of Classification Search
CPC ...... G02B 13/008; G02B 13/08; G02B 13/22; H04N 23/55; H04N 5/33
See application file for complete search history.

(56) References Cited

U.S. PATENT DOCUMENTS 5,930,050 A    7/1999  Dewald
6,181,482 B1   1/2001  Grafton
(Continued)

*Primary Examiner* — Mishawn N. Hunter
(74) *Attorney, Agent, or Firm* — Haynes and Boone, LLP

(57) ABSTRACT

Aspect ratio modifying imaging systems and methods are provided. In one example, an infrared imaging device includes at least one lens element configured to transmit electromagnetic radiation associated with a portion of a scene. The portion has a first aspect ratio. The electromagnetic radiation includes mid-wave and/or long-wave infrared light. The at least one lens element has a freeform surface having no translational symmetry and no rotational symmetry. The infrared imaging device further includes a detector array configured to receive image data associated with the electromagnetic radiation from the at least one lens element and generate, based on the image data, an image. The image data has a second aspect ratio different from the first aspect ratio. Each of the first and second aspect ratios is a ratio of a size along a first direction and a size along a second direction orthogonal to the first direction.

20 Claims, 11 Drawing Sheets

(51) Int. Cl.
*G02B 13/22* (2006.01)
*H04N 5/33* (2023.01)
*H04N 23/55* (2023.01)

(56) References Cited

U.S. PATENT DOCUMENTS

| | | |
|---|---|---|
| 7,697,055 B2 | 4/2010 | Imoto et al. |
| 2007/0052833 A1 | 3/2007 | Matsui et al. |
| 2009/0268305 A1 | 10/2009 | Pretorius |
| 2018/0027155 A1* | 1/2018 | Nakamura ............... G02B 7/04 |
| | | 348/374 |
| 2018/0364458 A1 | 12/2018 | Avila et al. |
| 2019/0306407 A1* | 10/2019 | Ely .................... H04N 23/6845 |

* cited by examiner

ASPECT RATIO MODIFYING IMAGING SYSTEMS AND METHODS

CROSS-REFERENCE TO RELATED APPLICATIONS

This patent application is a U.S. National Stage Patent Application under 35 U.S.C. 371 of International Patent Application No. PCT/US2020/028857 filed Apr. 17, 2020 and entitled "ASPECT RATIO MODIFYING IMAGING SYSTEMS AND METHODS," which claims priority to and benefit of U.S. Provisional Patent Application No. 62/841,161 filed Apr. 30, 2019 and entitled "ASPECT RATIO MODIFYING IMAGING SYSTEMS AND METHODS," which are hereby incorporated by reference in their entirety.

TECHNICAL FIELD

One or more embodiments relate generally to optical components for imaging and more particularly, for example, to aspect ratio modifying imaging systems and methods.

BACKGROUND

Imaging systems may include an array of detectors, with each detector functioning as a pixel to produce a portion of a two-dimensional image. In some cases, imaging systems may include one or more optical elements (e.g., lenses, mirrors) to facilitate imaging applications, such as by directing light to the array of detectors. There are a wide variety of image detectors, such as visible-light image detectors, infrared image detectors, or other types of image detectors that may be provided in an image detector array for capturing an image. As an example, a plurality of sensors may be provided in an image detector array to detect electromagnetic (EM) radiation at desired wavelengths. In some cases, such as for infrared imaging, readout of image data captured by the detectors may be performed in a time-multiplexed manner by a readout integrated circuit (ROIC). The image data that is read out may be communicated to other circuitry, such as for processing, storage, and/or display. In some cases, a combination of a detector array and an ROIC may be referred to as a focal plane array (FPA). Advances in process technology for FPAs and image processing have led to increased capabilities and sophistication of resulting imaging systems.

SUMMARY

In one or more embodiments, an infrared imaging device includes at least one lens element configured to transmit electromagnetic radiation associated with a portion of a scene. The portion has a first aspect ratio. The electromagnetic radiation includes mid-wave and/or long-wave infrared light. The at least one lens element has a freeform surface having no translational symmetry and no rotational symmetry. The infrared imaging device further includes a detector array configured to receive image data associated with the electromagnetic radiation from the at least one lens element and generate, based on the image data, an image. The image data has a second aspect ratio different from the first aspect ratio. Each of the first and second aspect ratios is a ratio of a size along a first direction and a size along a second direction orthogonal to the first direction.

In one or more embodiments, a method includes transmitting, by at least one lens element, electromagnetic radiation associated with a portion of a scene. The portion of the scene has a first aspect ratio. The electromagnetic radiation includes mid-wave infrared light and/or long-wave infrared light. The method further includes receiving, by a detector array, image data associated with the electromagnetic radiation. The image data has a second aspect ratio different from the first aspect ratio. Each of the first aspect ratio and the second aspect ratio is a ratio of a size along a first direction and a size of a second direction orthogonal to the first direction. The method further includes generating, by the detector array, an image based on the image data.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

Figure 1:
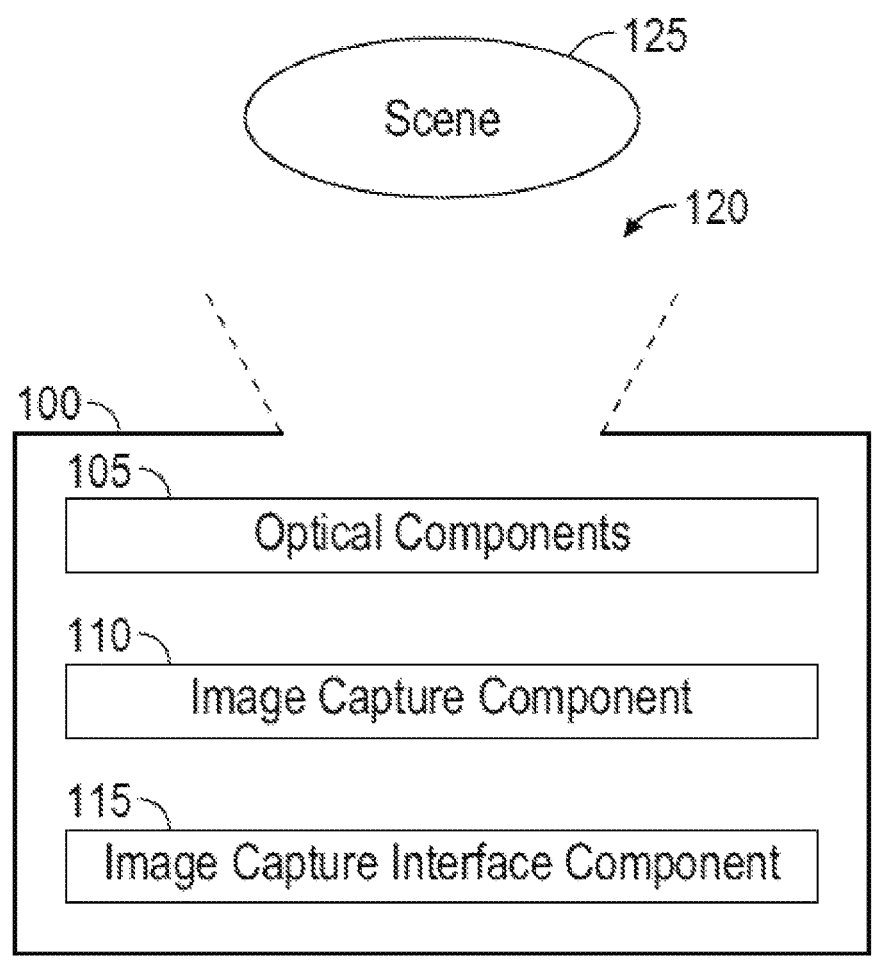
FIG. 1 illustrates a block diagram of an infrared imaging device in accordance with one or more embodiments of the disclosure.

Embodiments of the present disclosure and their advantages are best understood by referring to the detailed description that follows. It is noted that sizes of various components and distances between these components may not be drawn to scale in the figures. It should be appreciated

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced using one or more embodiments. In one or more instances, structures and components are shown in block diagram form in order to avoid obscuring the concepts of the subject technology. One or more embodiments of the subject disclosure are illustrated by and/or described in connection with one or more figures and are set forth in the claims.

In one or more embodiments, aspect ratio modifying imaging systems and methods are provided. In some aspects, such imaging systems and methods are utilized for infrared imaging, such as thermal infrared imaging. In one embodiment, an imaging device includes a detector array and at least one lens element. The detector array may receive image data (e.g., electromagnetic radiation) having an aspect ratio projected (e.g., directed, transmitted) by the lens element(s) of the detector array onto the imaging device. The detector array may generate an image based on the image the received image data. In an aspect, a scene may be referred to as an object, a target scene, or a target object. The lens element(s) of the imaging device may be transmissive of electromagnetic radiation within a waveband dependent on a desired application. In an aspect, the imaging device may be an infrared imaging device for facilitating capture of a waveband encompassing at least a portion of the thermal infrared spectrum, such as a mid-wave infrared spectrum and/or a long-wave infrared spectrum. In infrared imaging applications, the detector array may include an array of microbolometers and/or an array of other types of infrared detectors. By way of non-limiting examples, a lens element may include silicon, germanium, chalcogenide glass, and/or germanium arsenide selenium (GeAsSe). Lens material used to manufacture lens elements is generally based on a desired application (e.g., a desired transmission waveband of the lens elements).

In an embodiment, an aspect ratio of the image data is a ratio of a size of the image data along a first direction and a size of the image along a second direction. In some cases, the first direction is orthogonal to the second direction. For explanatory purposes, the Cartesian coordinate system is generally used in the present disclosure, in which the first direction may be an x-direction and the second direction may be a y-direction, or vice versa. A third direction may be denoted as a z-direction and is orthogonal to the x-direction and y-direction. Other coordinate systems may be utilized dependent on application.

For a given lens element of the imaging device, the lens element may receive EM radiation associated with a portion of a scene and may transmit the EM radiation. The lens element may be characterized by a focal length or focal lengths appropriate to capture a certain aspect ratio. In this regard, the portion of the scene captured by the lens element is of the certain aspect ratio. The focal length may be indicative of a field of view of the lens element. In an embodiment, an aspect ratio of the portion of the scene is a ratio of a size of the portion along the first direction and a size of the portion along the second direction. The lens element may have a different focal length in different directions. For example, the lens element may have a focal length $f_x$ in the x-direction and a focal length $f_y$ in the y-direction. The focal lengths $f_x$ and $f_y$ may correspond to a horizontal field of view (FOV) and a vertical FOV, respectively, of the lens element.

In a case the imaging device includes a single lens element, the single lens element may receive EM radiation from the portion of the scene and transmit (e.g., direct, project) the EM radiation to the detector array. In some applications, the single lens element may be or may include a refractive element that refracts the EM radiation onto the detector array. In a case the imaging device includes a series of lens elements, each lens element may receive and direct EM radiation to a next lens element of the series, with a last lens element receiving and directing EM radiation to the detector array. In some applications, at least one of the lens elements in the series refracts EM radiation.

The imaging device may include a lens barrel (e.g., also referred to as a lens housing) to hold (e.g., receive, secure, align) one or more lens elements. The imaging device may include a housing coupled to the lens barrel. The housing may include (e.g., enclose) the detector array. In some cases, the housing may include a processor to process image data from the detector array, memory to store raw image data and/or processed image data, a battery, and/or other components to facilitate operation of the imaging device.

In some embodiments, each lens element may include at least one mating feature (e.g., also referred to as a mounting feature). The lens barrel may have a corresponding mating feature(s) that couples to a mating feature(s) of the lens element(s) to receive and secure the lens element(s). In this regard, each mating feature of a lens element may couple to a corresponding mating feature of the lens barrel to couple the lens element to the lens barrel. In one example, a mating feature of a lens element may include a first surface and a second surface at an angle (e.g., 90° angle, obtuse angle, or acute angle) relative to the first surface, and a mating feature of a lens barrel may have corresponding surfaces to couple to the first and second surfaces. In another example, a mating feature of a lens element may include a pin portion, and a mating feature of a lens barrel may include a slot portion to receive the pin portion, and/or vice versa. More generally, a mating feature(s) of a lens element and a corresponding mating feature(s) of a lens barrel may be any structure (e.g., indentation, hole, pin, or other structure) that facilitates coupling of the lens element to the lens barrel. In some aspects, a mating feature may be defined as part of a freeform surface.

In some cases, a mating feature of a lens element may be appropriate to facilitate rotation and/or other movement of the lens element. In some cases, a mating feature may be utilized to facilitate alignment of a lens element, such as via pattern recognition during molding, machining, and/or assembling. For example, one or more mating features on a surface of a lens element can be located (e.g., using pattern recognition to scan the surface) to facilitate machining of a different surface of the lens element according to a desired design (e.g., freeform surface design). As another example, a mating feature(s) of a surface(s) of a first lens element and/or a mating feature(s) of a surface(s) of a second lens element may be utilized to facilitate alignment of the first lens element relative to the second lens element.

In various embodiments, the aspect ratio of the portion of the scene is different from the aspect ratio of image data received by the detector array. In one example embodiment, the aspect ratio of the portion of the scene may be 3:1 (e.g., or other highly asymmetrical aspect ratio) whereas the aspect ratio of the image data received by the detector array may be 4:3, 5:4, or 16:9 by way of non-limiting examples. In some embodiments, the lens element(s) may have freeform surfaces to facilitate such aspect ratio modification from the aspect ratio of the portion of the scene to the aspect ratio of the image data. A freeform surface has no translational symmetry and no rotational symmetry. A lens element having at least one freeform surface may be referred to as a freeform lens. In an aspect, at least one of the lens element(s) (or surface thereof) is a refractive element and at least one of the lens element(s) (or surface thereof) is a diffractive element. The diffractive element may be utilized to correct chromatic aberrations. In one case, the diffractive element may be formed by a freeform surface. In some aspects, lens elements formed with freeform surfaces generally have less weight and are of smaller sizes relative to conventional anamorphic lenses that rely on cylindrical and rotationally symmetric elements. As such, lens elements formed with freeform surfaces may be of appropriate compactness for integration into a camera module (e.g., of a mobile phone).

In one example embodiment, aspect ratio modifying imaging systems and methods may be utilized in automotive imaging applications. In automotive imaging applications, an imaging device having a panoramic field of view may be desired. For example, the imaging device may include a front looking camera. In some cases, the front looking camera may be utilized to capture long-wave infrared light and/or mid-wave infrared light. As an example, a panoramic field of view having around a 3:1 aspect ratio may be desired. A 3:1 aspect ratio sensor may not be readily available in the market and designing, prototyping, and manufacturing of a 3:1 format detector array (e.g., microbolometer array) may be cost ineffective and/or associated with a long lead time exercise. In this example, using various embodiments, the 3:1 aspect ratio scene may be captured using standard 4:3 or 5:4 imaging aspect ratio sensors by disposing a lens element(s) between the scene and the detector array to allow directing of EM radiation to the detector array via the lens element(s). In an aspect, at least one of the lens element(s) (or surface thereof) is a refractive element and at least one of the lens element(s) (or surface thereof) is a diffractive element. In one case, the diffractive element may be formed by a freeform surface.

FIG. 1 illustrates a block diagram of an infrared imaging device 100 in accordance with one or more embodiments of the disclosure. The infrared imaging device 100 may be used to capture and process image frames. The infrared imaging device 100 includes optical components 105, an image capture component 110, and an image capture interface component 115.

The optical components 105 may receive EM radiation through an aperture 120 of the infrared imaging device 100 and pass the EM radiation to the image capture component 110. For example, the optical components 105 may direct and/or focus EM radiation on the image capture component 110. The optical components 105 may include one or more windows, lenses, mirrors, beamsplitters, beam couplers, and/or other components. In an embodiment, the optical components 105 may include one or more chalcogenide lenses, such as lenses made of $As_{40}Se_{60}$, that allow for imaging in a wide infrared spectrum. Other materials, such as silicon, germanium, and GeAsSe, may be utilized depending on desired transmission characteristics, such as desired transmission wavelengths and/or ray transfer matrix characteristics.

The image capture component 110 includes, in one embodiment, one or more sensors (e.g., visible-light sensor, infrared sensor, or other type of detector) for capturing image signals representative of an image of a scene 125. The image capture component 110 may capture (e.g., detect, sense) infrared radiation with wavelengths in the range from around 700 nm to around 1 mm, or portion thereof. For example, in some aspects, the image capture component 110 may include one or more sensors sensitive to (e.g., better detect) thermal infrared wavelengths, including mid-wave infrared (MWIR) radiation (e.g., EM radiation with wavelength of 2-7 µm) and/or long-wave infrared (LWIR) radiation (e.g., electromagnetic radiation with wavelength of 7-15 µm). In one embodiment, the sensor(s) of the image capture component 110 may represent (e.g., convert) or facilitate representation of a captured thermal image signal of the scene 125 as digital data (e.g., via an analog-to-digital converter).

The image capture interface component 115 may receive image data captured at the image capture component 110 and may communicate the captured image data to other components or devices, such as via wired and/or wireless communication. In various embodiments, the infrared imaging device 100 may capture image frames, for example, of the scene 125.

In some embodiments, the optical components 105, image capture component 110, and image capture interface component 115 may be housed in a protective enclosure. In one case, the protective enclosure may include a lens barrel (e.g., also referred to as a lens housing) that houses the optical components 105 and a housing that houses the image capture component 110 and/or the image capture interface component 115. In this case, the lens barrel may be coupled to the housing. In an aspect, the protective enclosure may be represented by the solid-line box in FIG. 1 having the aperture 120. For example, the aperture 120 may be an opening defined in the protective enclosure that allows electromagnetic radiation to reach the optical components 105. In some cases, the aperture 120 may be a limiting aperture of the infrared imaging device 100.

The infrared imaging device 100 may represent any type of camera system which, for example, detects electromagnetic radiation (e.g., thermal radiation) and provides representative data (e.g., one or more still image frames or video image frames). For example, the infrared imaging device 100 may be configured to detect visible light and/or infrared radiation and provide associated image data.

Figure 2A:
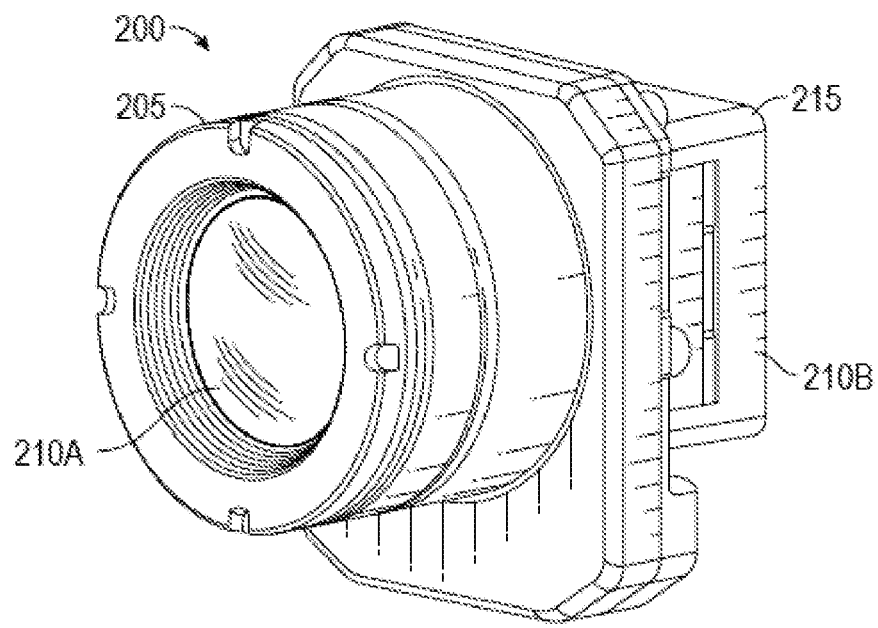
FIG. 2A illustrates a perspective view of an infrared imaging device in accordance with one or more embodiments of the disclosure.

FIG. 2A illustrates a perspective view of an infrared imaging device 200 in accordance with one or more embodiments of the disclosure. As one example, the infrared imaging device 200 may be an LWIR thermal camera (e.g., for capturing electromagnetic radiation with wavelengths of 7-14 15). In other cases, the infrared imaging device 200 may be utilized to capture electromagnetic radiation within other wavelength ranges.

The infrared imaging device 200 may include a lens barrel 205 configured to accommodate lens elements 210A and 210B. The infrared imaging device 200 also may include an image capture portion 215 including an image capture component configured to capture images viewed through the lens barrel 205. The image capture portion 215 may include arrays of microbolometers configured to detect EM radiation. As one example, the arrays of microbolometers may be configured to detect long-wave infrared light of wavelengths between 7.5 µm and 13.5 µm. In an embodiment, the infrared imaging device 200 may be the infrared imaging device 100 of FIG. 1. In this embodiment, the optical components 105 of FIG. 1 may include the lens elements 210A and 210B, and the image capture component 110 of FIG. 1 may include the image capture portion 215.

Figure 2B:
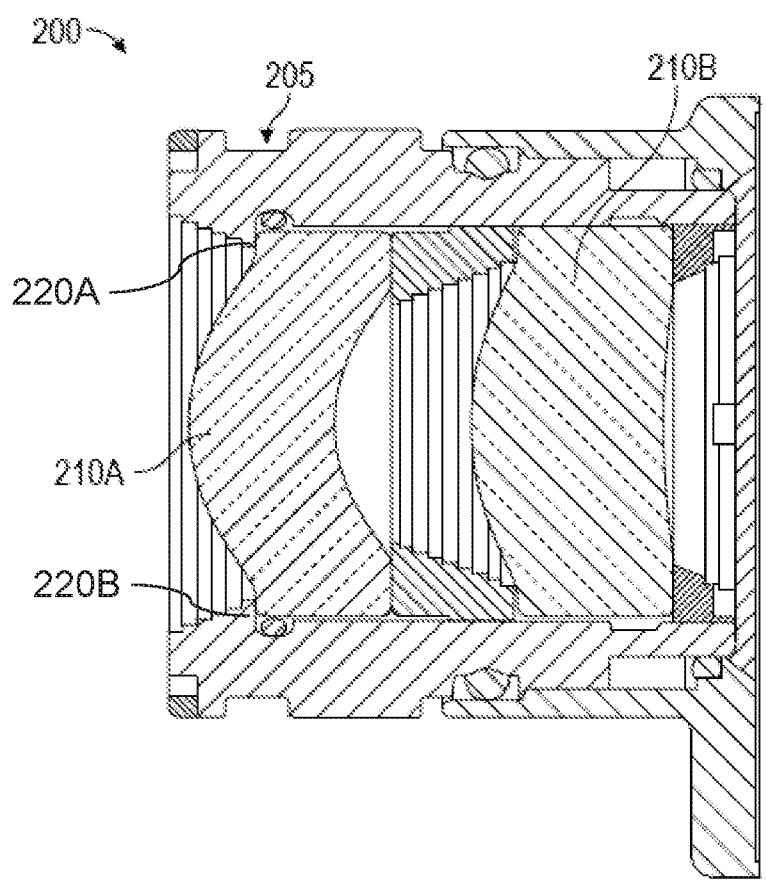
FIG. 2B illustrates a cross-sectional view of the infrared imaging device of FIG. 2A in accordance with one or more embodiments of the disclosure.

FIG. 2B illustrates a cross-sectional view of the infrared imaging device 200 of FIG. 2A in accordance with one or more embodiments of the disclosure. As shown in FIG. 2B, the lens elements 210A and 210B are lenses accommodated in the lens barrel 205. In one embodiment, one or both of the lens elements 210A and 210B may be lenses configured to transmit a wide spectrum of infrared light, such as chalcogenide lenses. Each of the lens elements 210A and 210B (e.g., and other optical components not labeled or shown in FIGS. 2A and 2B) may have specific optical characteristics, such as a specific effective focal length (EFL) and modulation transfer function (MTF). The lens elements 210A and 210B may coordinate to direct and focus infrared light onto the image capture portion 215. A limiting aperture associated with a lens system including the lens elements 210A and 210B defines an amount of light that is transmitted into the infrared imaging device 200. The limiting aperture may have spatial dimensions comparable to spatial dimensions of a front optical surface of the lens element 210A. In FIG. 2B, the limiting aperture is positioned in front of the lens element 210A and defined by physical properties (e.g., shape, size, material) of the lens element 210A and physical properties of a structure that holds (e.g., fixedly secures, movably secures) the lens element 210A. The structure includes holding structure 220A and 220B. As shown in FIG. 2B, a portion of the holding structures 220A and 220B conforms in shape to a portion of the lens element 210A. The structure may be formed of metal or generally any material appropriate to hold/secure the lens element 210A.

Figure 3:
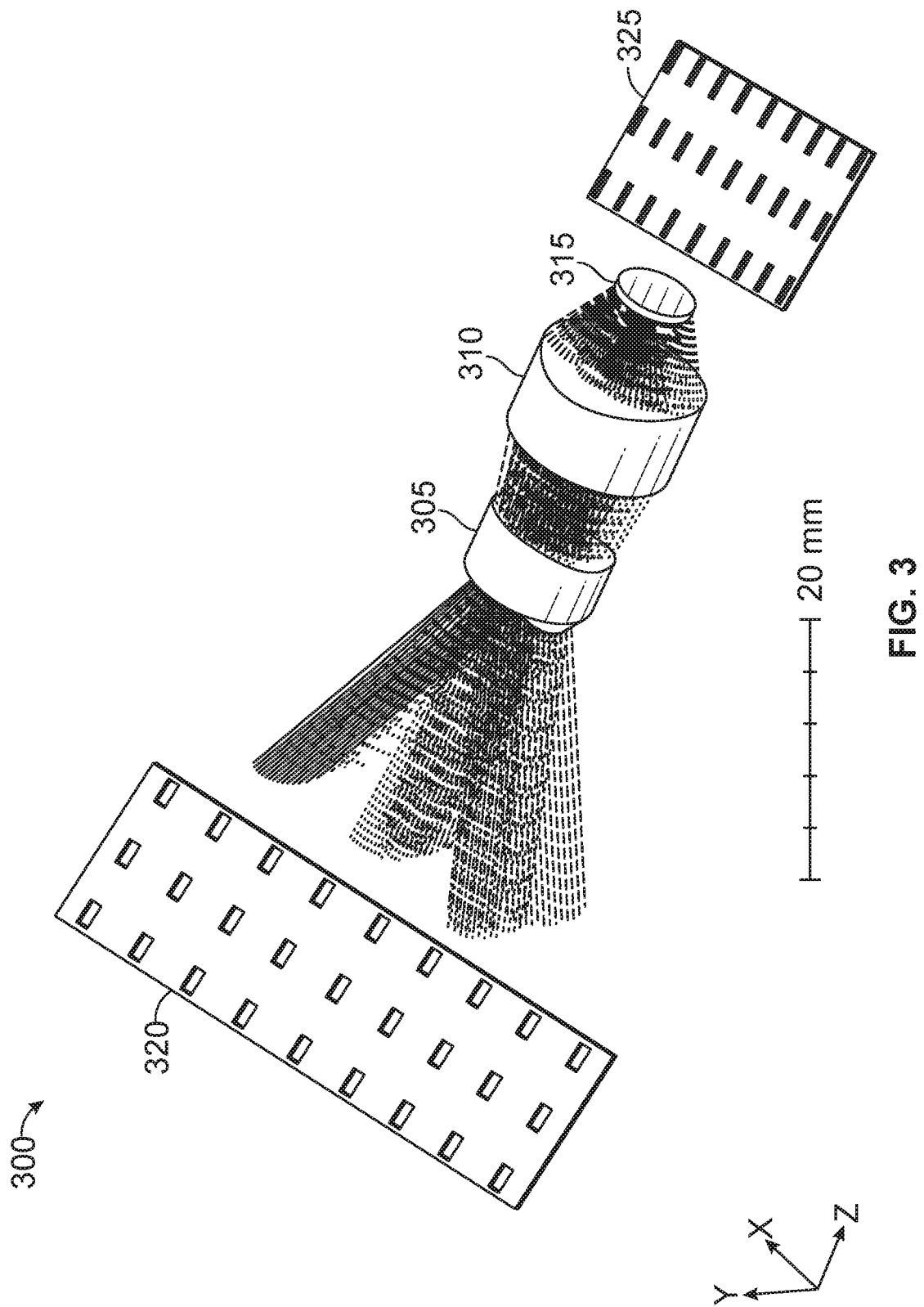
FIG. 3 illustrates a perspective view of an optical system in accordance with one or more embodiments of the disclosure.
Figure 4A:
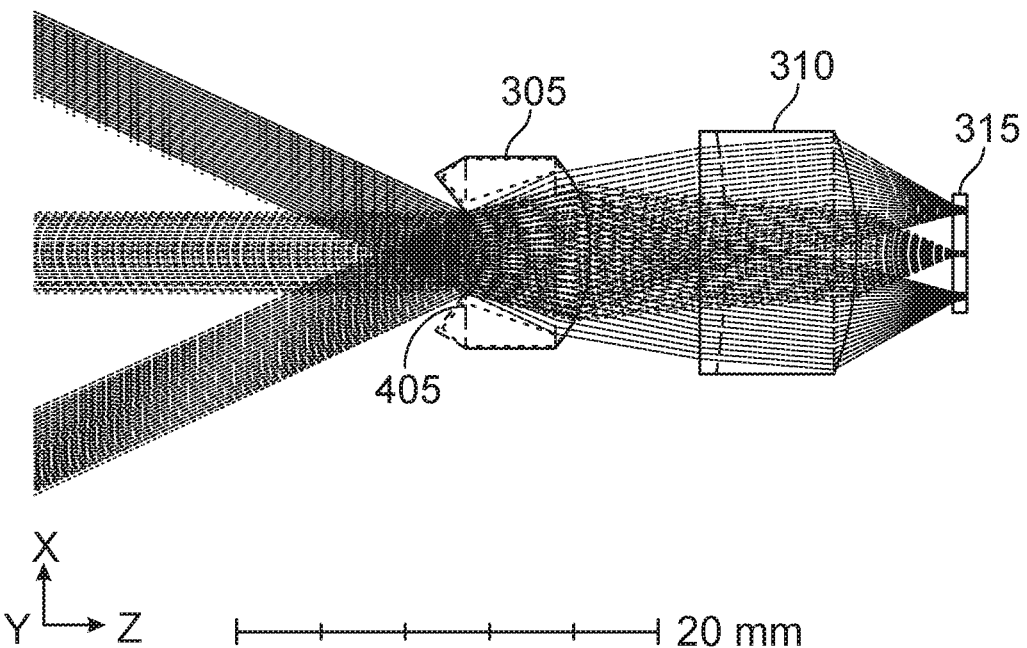
FIGS. 4A and 4B illustrate a cross-section view of the optical system of FIG. 3 in the XZ plane and the YZ plane, respectively.
Figure 4B:
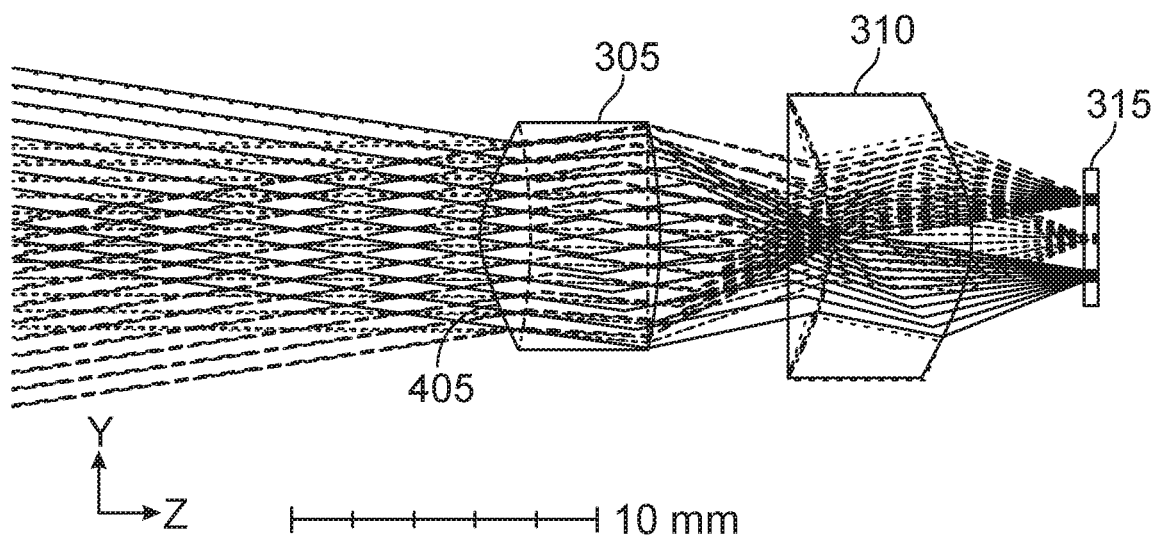

FIG. 3 illustrates a perspective view of an optical system 300 in accordance with one or more embodiments of the disclosure. The optical system 300 is oriented along three orthogonal directions, denoted as X, Y, and Z. The X-direction and the Y-direction may be referred to as the horizontal direction and the vertical direction, respectively. FIGS. 4A and 4B illustrate a cross-section view of the optical system 300 in the XZ plane and the YZ plane, respectively. The optical system 300 includes a lens element 305, a lens element 310, and a detector array 315. In an aspect, the lens element 305 and/or 310 has one or more freeform surfaces that differentiates effective focal lengths between two orthogonal directions. A limiting aperture 405 is provided in front of the lens element 305. The limiting aperture 405 may have spatial dimensions comparable to spatial dimensions of a front surface of the lens element 305. The lens element 305 and/or 310 may be made of chalcogenide glass (e.g., IG6 chalcogenide glass). In this embodiment, the optical components 105 of FIG. 1 may include the lens elements 305 and 310, and the image capture component 110 of FIG. 1 may include the detector array 315.

The limiting aperture 405 defines an amount of light that is transmitted into the optical system 300. The limiting aperture 405 may have spatial dimensions comparable to spatial dimensions of a front optical surface of the lens element 305. In some cases, the limiting aperture 405 may be the same or substantially the same in size and shape as a clear aperture of the lens element 305. The limiting aperture 405 may be defined by physical properties of the lens element 305, such as a size, shape, and material of the front surface of the lens element 305, and physical properties of a structure that holds the lens element 305. For instance, the structure may be a part of a lens barrel. In one case, the structure may be a metal structure at least partially in front of the lens element 305. As one example, the structure may be a metal structure that has a shape that conforms to the front surface of the lens element 305.

The lens element 305 receives EM radiation of a scene 320. The scene 320 may be referred to as an object, a target scene, or a target object. The lens element 305 can be utilized to capture EM radiation associated with an aspect ratio of a to b (e.g., also denoted as a:b), where the aspect ratio is a ratio between a first dimension/direction (e.g., an scene width) and a second dimension/direction (e.g., a scene height). The lens element 305 directs the received EM radiation to the lens element 310. The lens element 310 directs the EM radiation received from the lens element 305 to the detector array 315. As such, the lens elements 305 and 310 collectively projects the scene 320 onto the detector array 315. The lens elements 305 and 310 may collectively convert the scene 320 of the aspect ratio a:b to image data having an aspect ratio c:d. In this regard, the lens elements 305 and 310 may be referred to as imaging an a:b aspect ratio scene/object onto a c:d aspect ratio sensor. FIG. 3 illustrates the scene 320 of the aspect ratio a:b ray tracked through the lens elements 305 and 310 to result in the image 325 of the aspect ratio c:d. The detector array 315 receives the image data and generates the image 325 based on the image data. The lens elements 305 and 310 may be appropriately designed to effectuate conversion from the aspect ratio of a:b to the aspect ratio of c:d. The aspect ratio of c:d may be a ratio that corresponds to a size (e.g., number of rows and columns of detector elements) of the detector array 315. In FIG. 3, slanted black bars shown in the image 325 represent distortion (e.g., in the form of squeezing along the X and Y directions). In an aspect, the image 325 is processed using processing circuitry downstream of the detector array 315 to correct the distortion (e.g., dewarp the image 325) to obtain a processed image. In some cases, such compression/distortion can be determined (e.g., as part of calibration) and appropriate processing performed to compensate for the compression/distortion.

As an example, the aspect ratio a:b may be 3:1 and the aspect ratio c:d may be 4:3. In this example, the detector array 315 may have a size of 320×256 sensors (e.g., 320× 256 array of microbolometers) and receives image data having the 4:3 aspect ratio. An effective focal length (collectively provided by the lens elements 305 and 310) in an X-direction and a Y-direction is 4.790 mm and 10.902 mm, respectively, which corresponds to a 50° horizontal FOV and a 16° FOV. Other aspect ratios a:b and c:d may be utilized dependent on application.

In an embodiment, to facilitate alignment of the horizontal FOV with the horizontal direction of the detector array 315 and the vertical FOV with the vertical direction of the detector array 315, one or both of the lens elements 305 and 310 can be moved relative to the detector array 315. In some aspects, the lens elements 305 and/or 310 may be moved via sliding motion (e.g., translational motion) to facilitate focusing, such as by using one or more actuators coupled to the lens elements 305 and/or 310. In one case, the sliding motion may be along the Z-axis (e.g., the direction perpendicular to the focal plane) while preserving a fixed angular orientation. In these aspects, a focusing mechanism of the lens elements 305 and/or 310 may include components (e.g., actuators) for moving the lens elements 305 and/or 310. In one case, a rotation about the Z-axis may be constrained within an alignment tolerance between the major FOV associated with the lens elements 305 and 310 and the corresponding major dimension (e.g., X-dimension) of the detector array 315 and/or constrained within an alignment tolerance between the minor FOV associated with the lens elements 305 and 310 and the minor dimension (e.g., Y-dimension) of the detector array 315.

In other aspects, one or more lenses may be focused by rotating the lens(es) inside a threaded housing.

Figure 5:
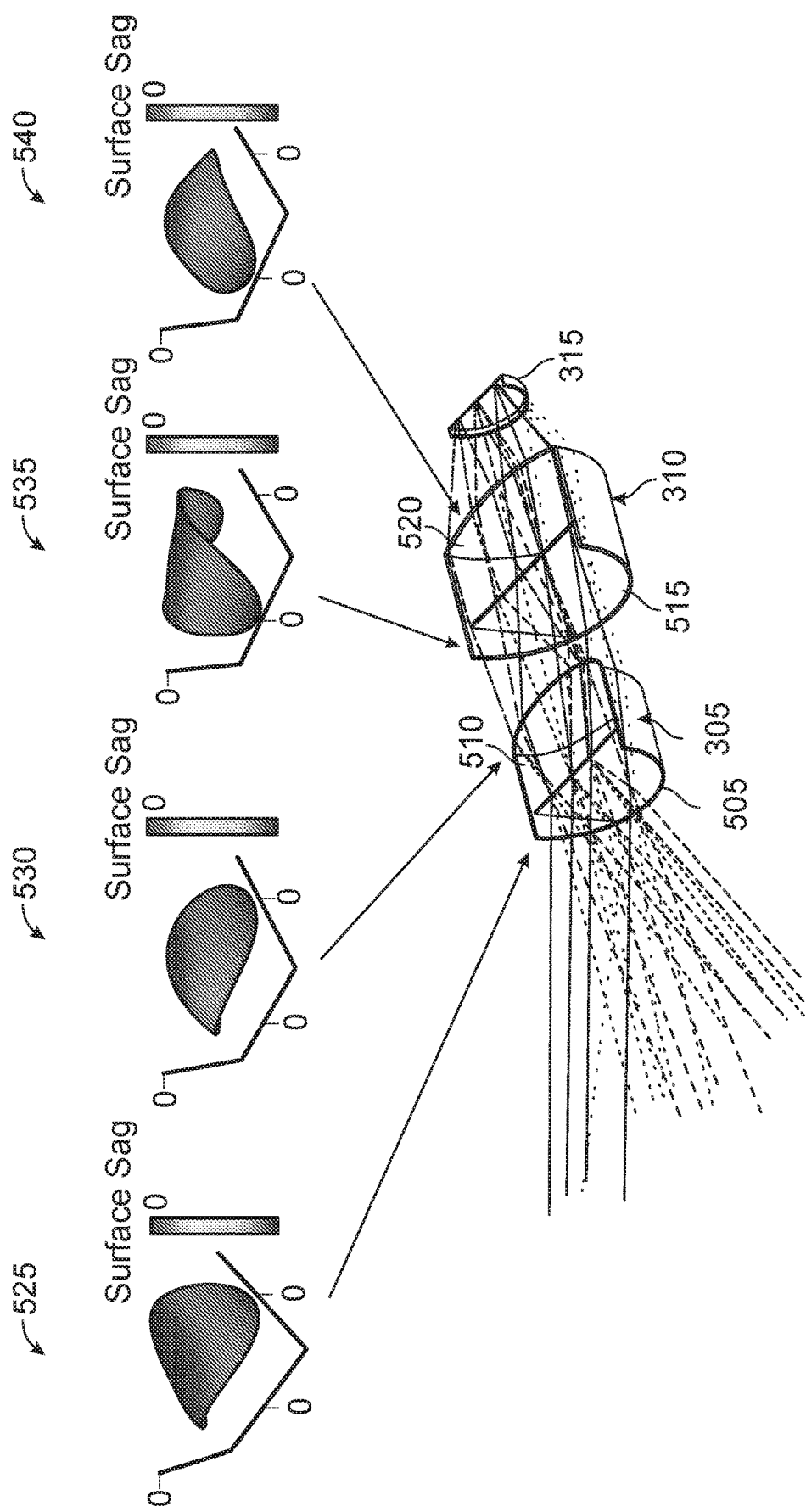
FIG. 5 illustrates another perspective view of the optical system of FIG. 3 along with examples of sags associated with various optical surfaces of lens elements of the optical system in accordance with one or more embodiments of the present disclosure.

FIG. 5 illustrates another perspective view of the optical system 300 along with examples of sags associated with various optical surfaces of the lens elements 305 and 310 in accordance with one or more embodiments of the present disclosure. The lens element 305 has a surface 505 and a surface 510 opposite the surface 505. The lens element 310 has a surface 515 and a surface 520 opposite the surface 515. The surface 505 of the lens element 305 faces the scene 320. The surface 510 of the lens element 305 faces the surface 515 of the lens element 310. The surface 520 of the lens element 310 faces the detector array 315. Graph 525, 530, 535, and 540 provide example sags of the surfaces 505, 510, 515, and 520, respectively. It is noted that the sags provided in the graphs 525, 530, 535, and 540 are by way of non-limiting examples. The surfaces 505 and/or 510 of the lens element 305 and/or the surfaces 515 and/or 515 of the lens element 310 may have different sags from those shown in the graphs 525, 530, 535, and 540.

In some embodiments, the surfaces 505, 510, 515, and 520 are each associated with a freeform lens prescription. In some aspects, each prescription may be expressed via coefficients of Chebyshev orthogonal polynomials according to the following:

$$z = \frac{c(x^2 + y^2)}{1 + \sqrt{1 - c^2(x^2 + y^2)}} + x_0 y_0 \sum_{i=0}^{N} \sum_{j=0}^{M} c(i, j) \cdot T_i\left(\frac{x}{x_0}\right) \cdot T_j\left(\frac{y}{y_0}\right)$$

where c(i, j) are normalized coefficients.

Table 1 illustrates example values of various parameters of the optical system 300.

Although the foregoing prescriptions are expressed via coefficients of Chebyshev orthogonal polynomials, other manners by which to express the prescriptions may be utilized. In addition, while the surfaces 505, 510, 515, and 520 are freeform surfaces, in other cases a lens element may have one freeform surface or no freeform surfaces.

Figure 6:
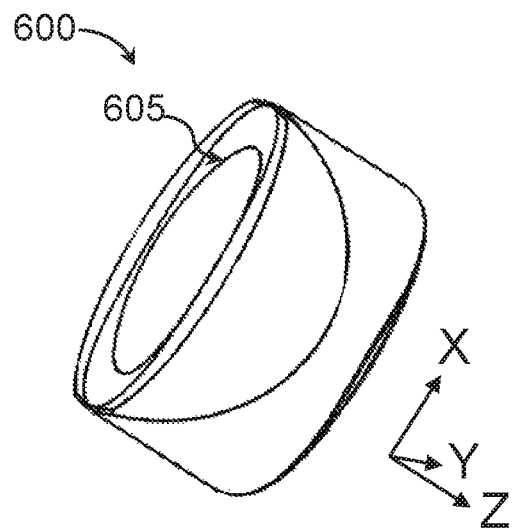
FIGS. 6-11 each illustrate an example of a lens element in accordance with one or more embodiments of the disclosure.
Figure 7:
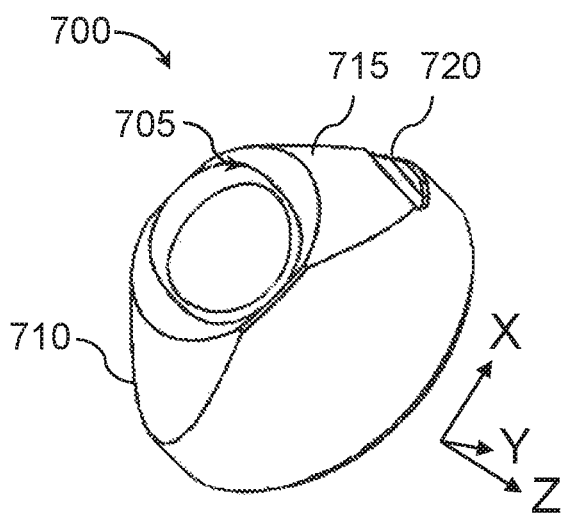
Figure 8:
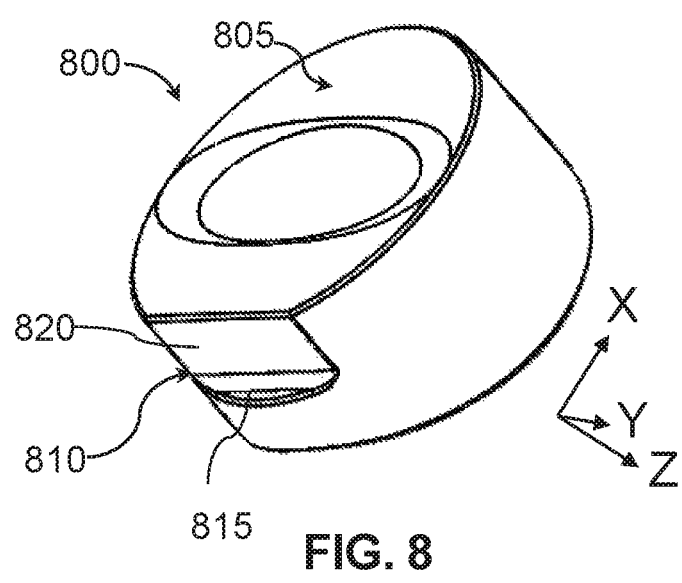

FIGS. 6-8 each illustrates an example of a lens element in accordance with one or more embodiments of the disclosure. In particular, FIGS. 6, 7, and 8 illustrate a lens element 600, 700, and 800, respectively. The lens elements 600, 700, and 800 extend along three directions (e.g., three orthogonal directions) X, Y, and Z. A limiting aperture of the lens element 600, 700, or 800 may be based on physical characteristics (e.g., shape, size) of a front surface 605, 705, or 805, respectively, of the lens elements 600, 700, and 800, respectively. One of more surfaces of the lens elements 600, 700, and/or 800 may be freeform surfaces. The lens elements 600, 700, and 800 may have physical characteristics/features, such as slopes (e.g., chamfers), indentations, etc., of various sizes and shapes at various locations as appropriate to direct light for an imaging application.

The lens element 700 has chamfers 710 and 715 and a mating feature 720. The lens element 800 includes a mating feature 810. The mating feature 810 has a first surface 815 and a second surface 820 at an angle relative to the first surface 815. For example, the first surface 815 may be orthogonal to or substantially orthogonal to the second surface 820. More generally, the mating features 720 and 810 may be of any appropriate shape, size, and/or other physical characteristic to facilitate mating of the lens element 700 and 800 to a lens housing, such as a lens barrel. For example, although the first surface 815 and the second surface 820 are depicted as being flat surfaces that are orthogonal to or substantially orthogonal to each other, in some cases the first surface 815 and the second surface 820 may be of any shape and at any angle to each other as appropriate to mate the lens element 800 to a lens housing.

Figure 9:
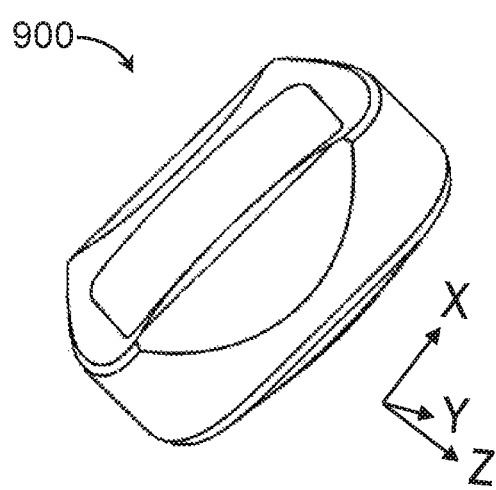
Figure 10:
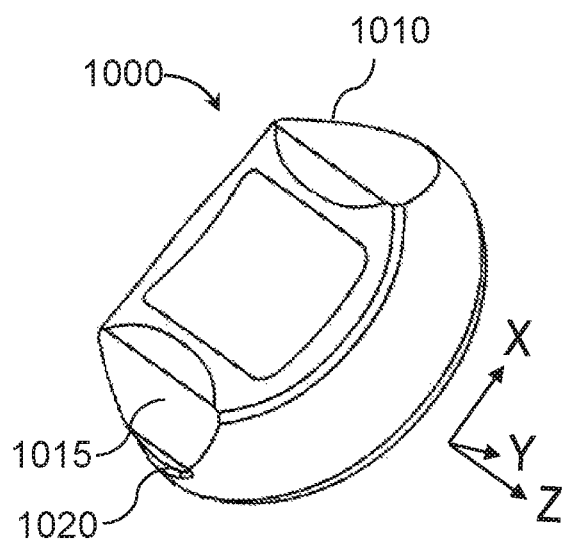
Figure 11:
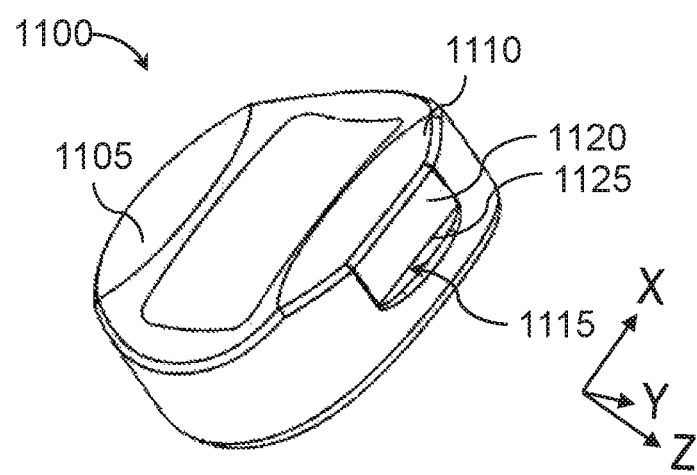

FIGS. 9-11 each illustrates an example of a lens element in accordance with one or more embodiments of the disclo-

|  | Lens Element 305 | | Lens Element 310 | |
| --- | --- | --- | --- | --- |
| Surface | Surface 505 | Surface 510 | Surface 515 | Surface 520 |
| Element Central Thickness [mm] | 5.548 | | 5.661 | |
| Material | IG6 | | IG6 | |
| Air gap between two elements [mm] | | 6.856 | | |
| Clear Aperture | 7.378 | 9.113 | 10.759 | 11.338 |
| Normalization Z Length [mm] | 5.000 | 5.000 | 12.000 | 12.000 |
| Normalization Y Length [mm] | 5.000 | 5.000 | 10.000 | 10.000 |
| $c(2, 0)$ [mm$^{-1}$] | −4.82E−02 | −3.57E−02 | 2.83E−03 | −2.79E−04 |
| $c(4, 0)$ [mm$^{-3}$] | 6.19E−03 | 1.09E−03 | −3.40E−03 | 2.10E−03 |
| $c(6, 0)$ [mm$^{-5}$] | 1.09E−03 | 2.47E−04 | −8.82E−04 | 1.87E−04 |
| $c(0, 2)$ [mm$^{-1}$] | −4.02E−03 | −1.64E−02 | −3.48E−03 | −1.27E−02 |
| $c(2, 2)$ [mm$^{-1}$] | 9.04E−03 | 3.80E−03 | 1.59E−03 | 2.71E−03 |
| $c(4, 2)$ [mm$^{-3}$] | 1.99E−03 | 1.19E−03 | 4.59E−04 | −2.54E−03 |
| $c(6, 2)$ [mm$^{-5}$] | −1.04E−03 | 2.30E−04 | 7.00E−04 | −2.29E−04 |
| $c(0, 4)$ [mm$^{-3}$] | 1.07E−03 | −1.32E−03 | 1.26E−03 | 7.81E−04 |
| $c(2, 4)$ [mm$^{-3}$] | 2.72E−03 | −1.46E−03 | −3.49E−03 | −7.30E−04 |
| $c(4, 4)$ [mm$^{-3}$] | −4.59E−04 | −6.50E−04 | −9.49E−04 | 9.00E−04 |
| $c(6, 4)$ [mm$^{-5}$] | −7.43E−04 | −1.01E−04 | 1.86E−04 | −2.56E−04 |
| $c(0, 6)$ [mm$^{-5}$] | 4.15E−04 | −2.18E−04 | 5.09E−04 | 4.63E−04 |
| $c(2, 6)$ [mm$^{-5}$] | 2.60E−04 | −2.81E−04 | 1.30E−03 | 1.35E−03 |
| $c(4, 6)$ [mm$^{-5}$] | −5.63E−04 | −4.15E−05 | −1.90E−03 | −7.25E−05 |
| $c(6, 6)$ [mm$^{-5}$] | −3.41E−04 | 5.59E−05 | −7.27E−05 | −1.29E−04 | sure. In particular, FIGS. 9, 10, and 11 illustrate a lens element 900, 1000, and 1100, respectively. The lens elements 900, 1000, and 1100 extend along three directions X, Y, and Z. One or more surfaces of the lens elements 900, 1000, and/or 1100 may be freeform surfaces. The lens elements 900, 1000, and 1100 may have physical characteristics/features (e.g., shapes, sizes) appropriate for a desired imaging application. The lens element 1000 has chamfers 1010 and 1015 and a mating feature 1020.

The lens element 1100 includes chamfers 1105 and 1110 and a mating feature 1115. The mating feature 1115 has a first surface 1120 and a second surface 1125 at an angle relative to the first surface 1120. Generally, the mating features 1020 and 1115 may be of an appropriate shape, size, and/or other physical characteristic to facilitate mating of the lens element 1000 and 1100 to a lens housing (e.g., lens barrel). In some embodiments, the optical components 105 of FIG. 1 may include the lens element 600, 700, or 800 as a front lens of the optical components 105 (e.g., lens element closer to the scene 125), and the lens element 900, 1000, or 1100 as a rear lens of the optical components 105 (e.g., lens element closer to the image capture component 110).

In some embodiments, formation of surfaces, such as freeform surfaces, to obtain the lens elements may be an iterative process. In some aspects, one or more surfaces of a lens element may be associated with a freeform lens prescription. For example, each prescription may be expressed via coefficients of Chebyshev orthogonal polynomials. Various parameters, such as those shown in Table 1, may be utilized to characterize a lens element. In some cases, trajectories of ray bundles may be analyzed, such as by determining associated ray transfer matrices, and appropriate adjustment to a remaining portion of a lens material may be performed. For example, the remaining portion of the lens material may be truncated based on analyzing the trajectories. In some cases, portions of the lens material that are truncated may include portions of the lens material through which no light passes. Such portions of the lens material may add bulk (e.g., and thus take up space) without performing imaging, and may be considered as serving no optical purpose. In some cases, such truncated portions may appear as chamfers in the lens elements. For example, with reference to FIG. 7, a lens material may be truncated to form the lens element 700 having the chamfers 710 and 715.

Figure 12A:
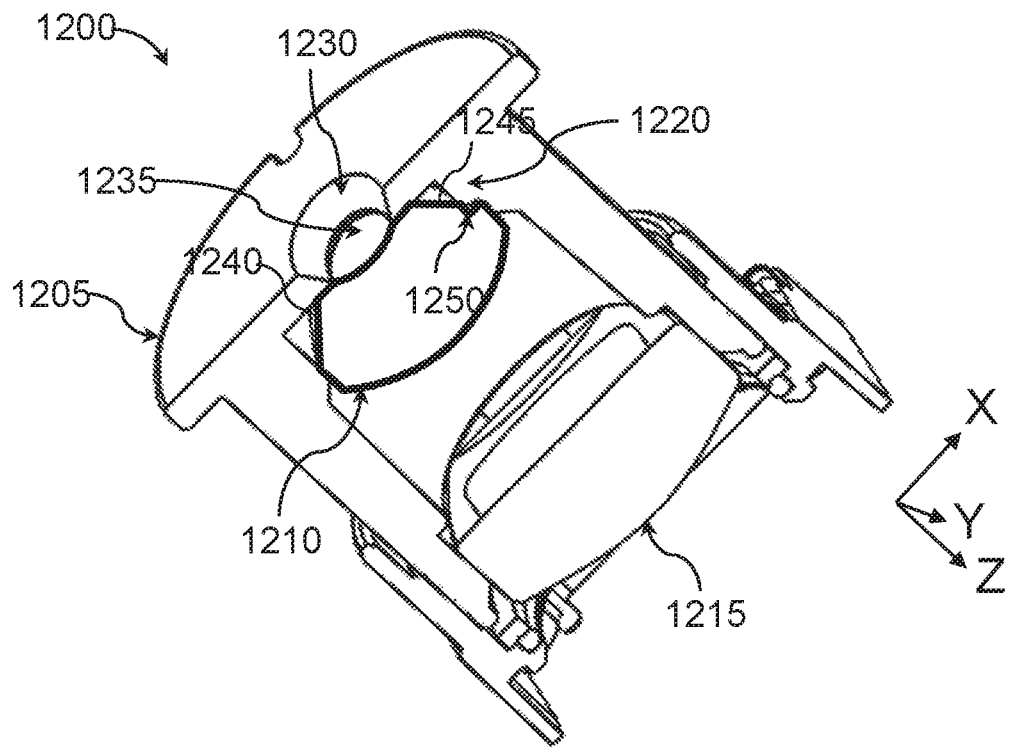
FIGS. 12A and 12B illustrate perspective views of an imaging device in accordance with one or more embodiments of the disclosure.
Figure 12B:
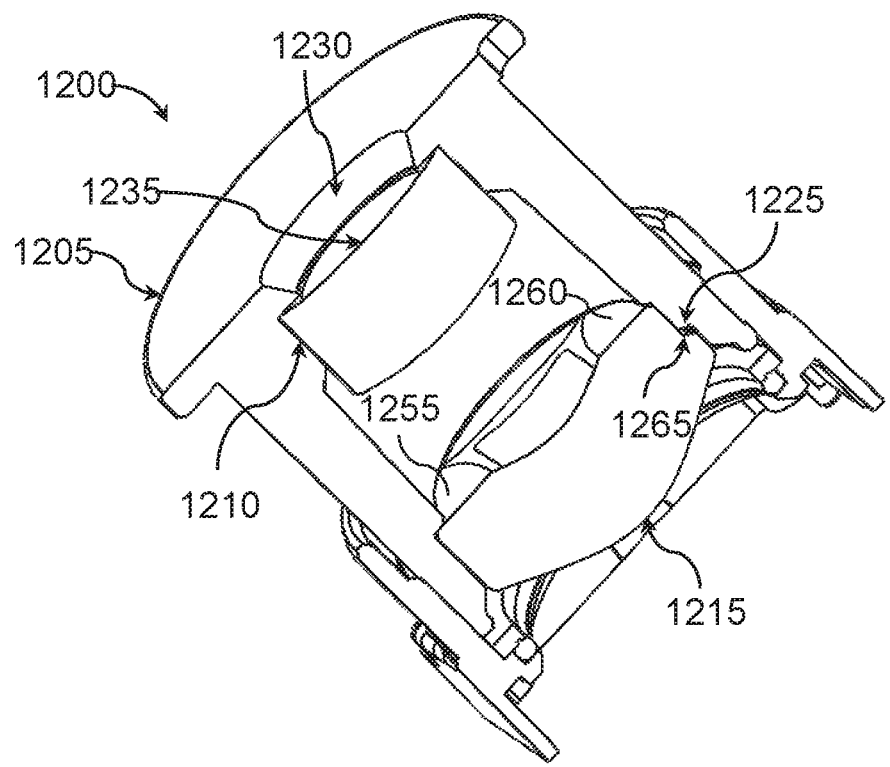

FIGS. 12A and 12B illustrate perspective views of an imaging device 1200 that includes a lens housing 1205 (e.g., a lens barrel) and lens elements 1210 and 1215 coupled to the lens housing 1205, in accordance with one or more embodiments of the disclosure. The imaging device 1200 and components thereof are oriented along three directions X, Y, and Z. The perspective view of FIG. 12A is rotated to obtain the perspective view of FIG. 12B. The lens housing 1205 includes mating features 1220 and 1225. The lens housing 1205 provides a limiting aperture 1230 in front of a front surface 1235 of the lens element 1210. The lens element 1210 includes chamfers 1240 and 1245 and a mating feature 1250. The mating feature 1250 couples to the mating feature 1220 of the lens housing 1205. The lens element 1215 includes chamfers 1255 and 1260 and a mating feature 1265. The mating feature 1265 couples to the mating feature 1220 of the lens housing 1205. As an example, in an embodiment, the lens element 1210 may be the lens element 700 of FIG. 7, and/or the lens element 1215 may be the lens element 1100 of FIG. 11. In this example, the chamfers 710 and 715 may be the chamfers 1240 and 1245, respectively, and the mating feature 1250 may be the mating feature 720. The chamfers 1105 and 1110 may be the chamfers 1255 and 1260, respectively, and the mating feature 1115 may be the mating feature 1265.

Figure 13A:
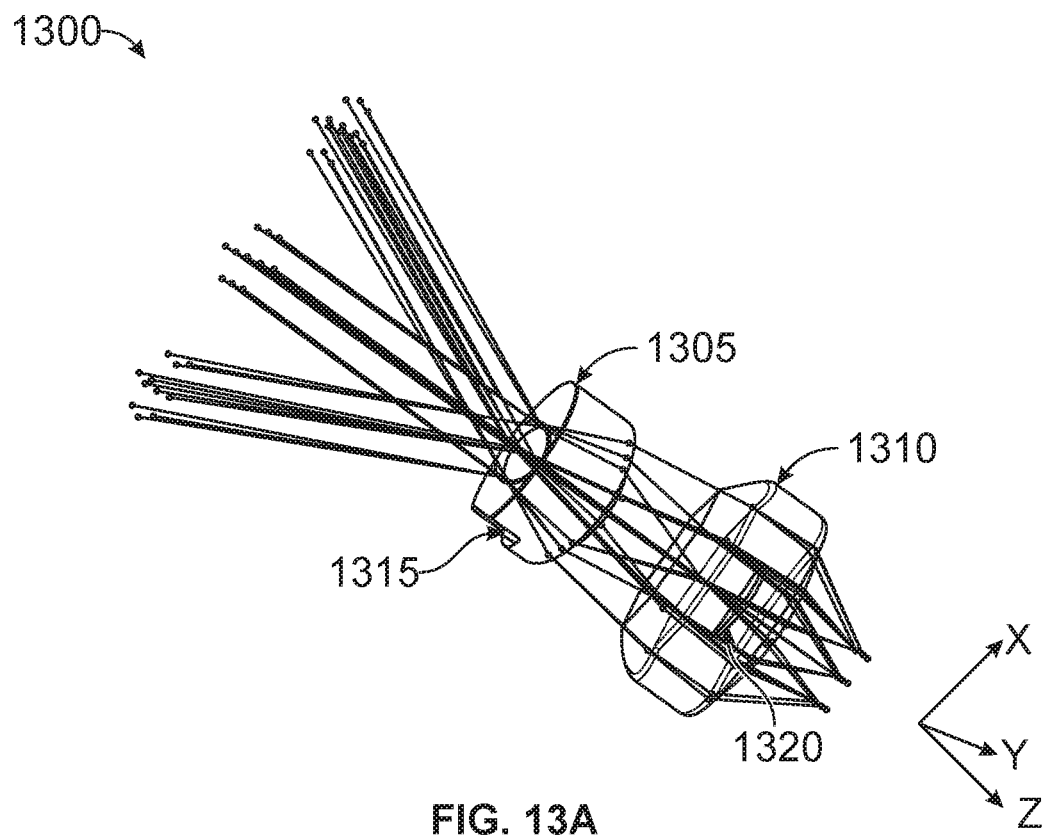
FIGS. 13A and 13B illustrate perspective views of an optical system and trajectories of ray bundles through the optical system in accordance with one or more embodiments of the disclosure.
Figure 13B:
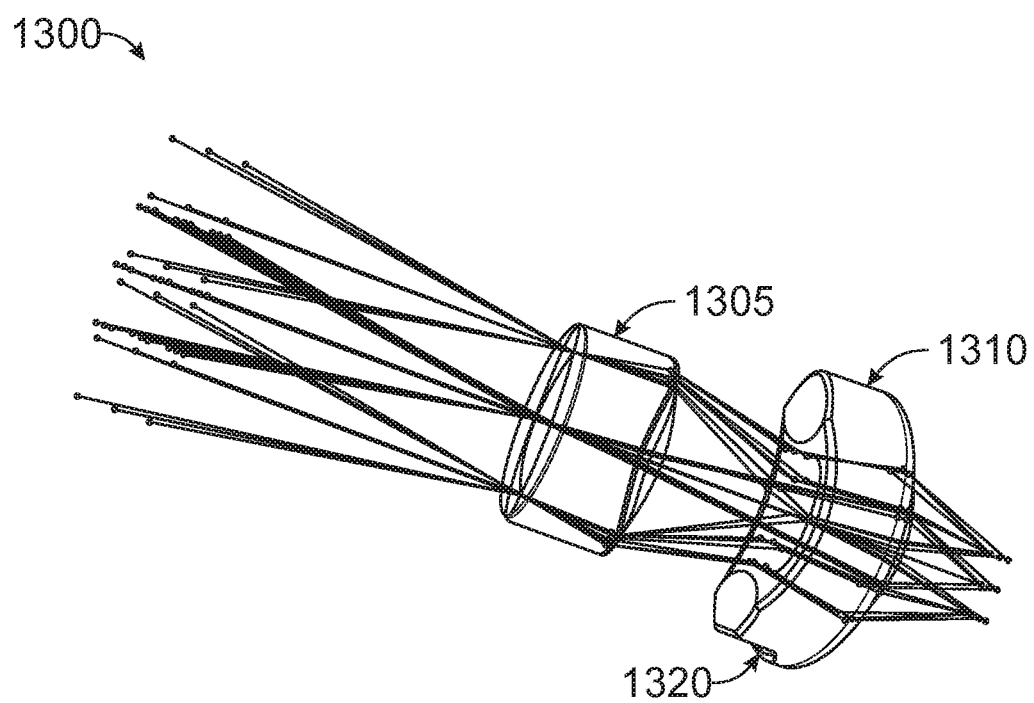

FIGS. 13A and 13B illustrate perspective views of an optical system 1300 and trajectories of ray bundles through the optical system 1300 in accordance with one or more embodiments of the disclosure. The optical system 1300 is oriented along three directions X, Y, and Z. The perspective view of FIG. 13A is rotated to obtain the perspective view of FIG. 13B. The optical system 1300 includes a lens element 1305 having a mating feature 1315 and a lens element 1310 having a mating feature 1320. The mating feature 1315 and 1320 may couple the lens element 1305 and 1310, respectively, to a lens housing (e.g., lens barrel). As an example, in an embodiment, the lens element 1305 may be the lens element 800 of FIG. 8, and/or the lens element 1310 may be the lens element 1100 of FIG. 11. In this example, the mating features 1315 and 1320 may be the mating features 810 and 1115, respectively.

In the optical system 1300, the lens elements 1305 and 1310 are arranged such that the mating feature 1315 and the mating feature 1320 are orthogonal or substantially orthogonal to each other. In other cases, mating features of two lens elements are not orthogonal or substantially orthogonal to each other. For example, the mating features of two lens elements may be parallel to each other or otherwise at any angle appropriate for a desired alignment of the lens elements. In this regard, an arrangement/orientation of the mating feature 1315 relative to that of the mating feature 1320 (and, more generally, an arrangement/orientation of various surfaces of the lens element 1305 to those of the lens element 1310) may be dependent, by way of non-limiting examples, on dimensional aspects of the lens elements 1305 and 1310 in relation to dimensional aspects of a lens housing configured to hold (e.g., receive, secure) the lens elements 1305 and 1310 and desired light propagation characteristics through the lens elements 1305 and 1310 (e.g., to direct light through the lens elements 1305 and 1310 to a detector array).

Figure 14A:
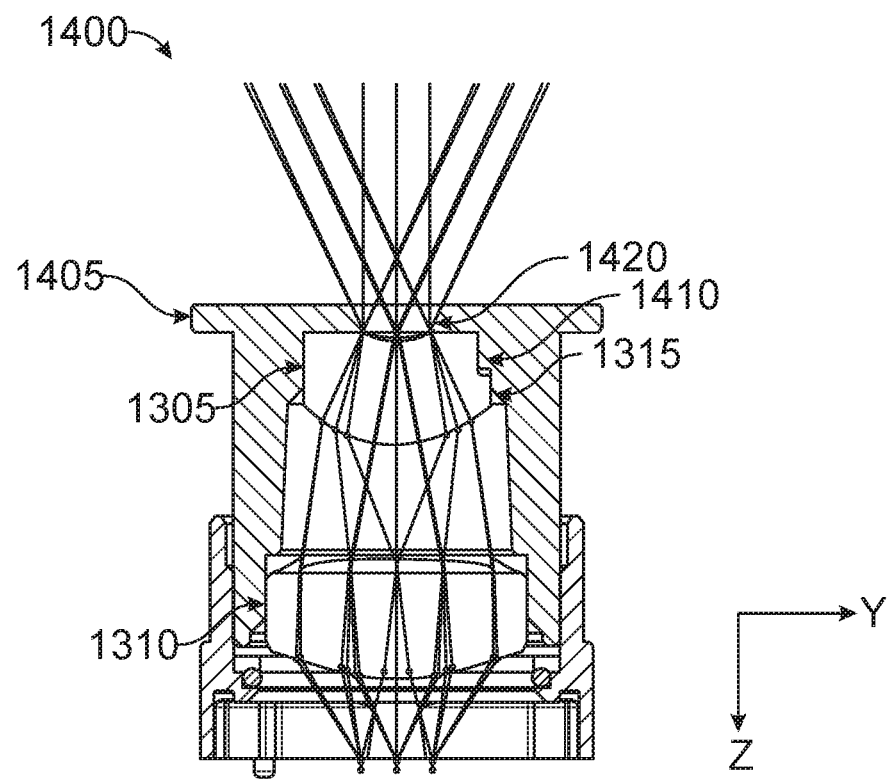
FIGS. 14A and 14B illustrate perspective views of an imaging device and trajectories of ray bundles through the imaging device in accordance with one or more embodiments of the disclosure.
Figure 14B:
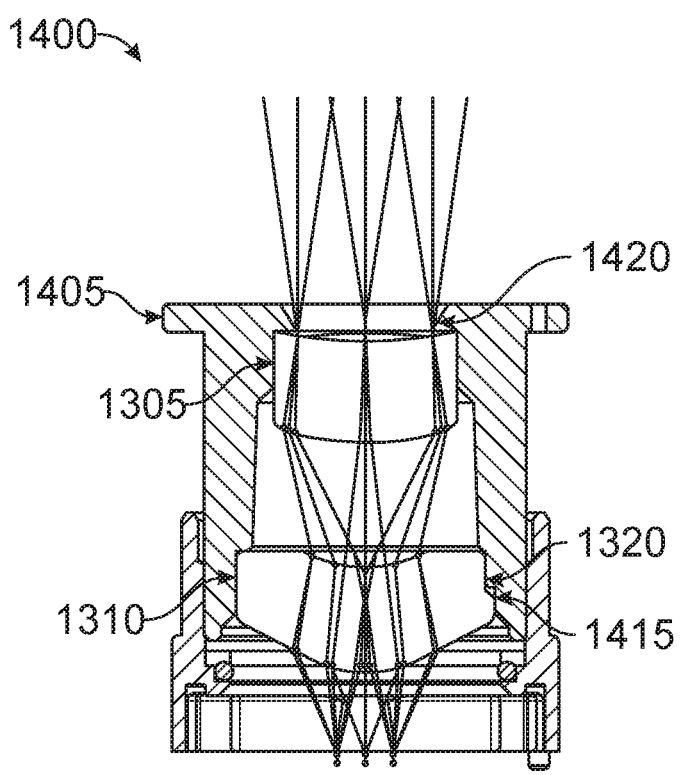

FIGS. 14A and 14B illustrate perspective views of an imaging device 1400 and trajectories of ray bundles through the imaging device 1400 in accordance with one or more embodiments of the disclosure. The imaging device 1400 includes a lens housing 1405 (e.g., a lens barrel) and the lens elements 1305 and 1310 coupled to the lens housing 1405. The imaging device 1400 and components thereof are oriented along three directions X, Y, and Z. The lens housing 1405 includes a mating feature 1410 that couples to the mating feature 1315 of the lens element 1305 and a mating feature 1415 that couples to the mating feature 1320 of the lens element 1310. A limiting aperture 1420 of the imaging device 1400 is provided by an aperture of the lens housing 1405 in front of a front surface of the lens element 1305. The limiting aperture may have spatial dimensions comparable to spatial dimensions of the front surface of the lens element 1305. As shown in the ray bundles, light propagates through the limiting aperture 1420, the lens element 1305, and the lens element 1310. Light can be directed by the lens element 1310 to a detector array (e.g., infrared detector array).

It is noted that while the foregoing mating features are primarily depicted as flat or substantially flat surfaces for mating with corresponding mating features of a lens housing, a mating feature of a lens element or a lens housing may be of any appropriate shape for coupling the lens element to the lens housing such that the lens element is appropriately positioned, secured, aligned, etc. to facilitate a desired imaging application. For example, a mating feature may be a structure, such as a protruding pin, that can be received by a corresponding mating feature of a lens housing. In some cases, a mating feature of a lens element may facilitate rotation and/or other movement of the lens element.

Figure 15:
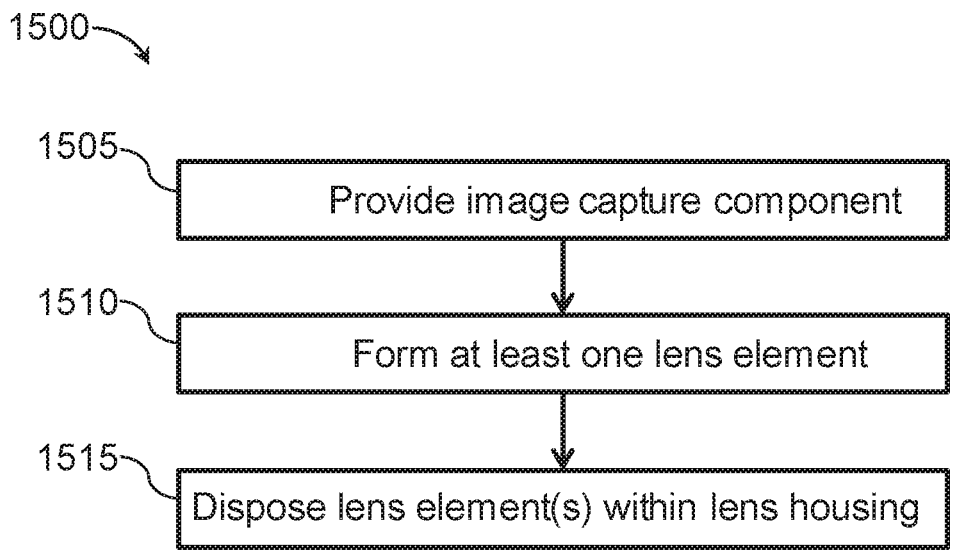
FIG. 15 illustrates a flow diagram of an example process for manufacturing an infrared imaging device in accordance with one or more embodiments of the disclosure.

FIG. 15 illustrates a flow diagram of an example process 1500 for manufacturing an infrared imaging device in accordance with one or more embodiments of the disclosure. For explanatory purposes, the example process 1500 is primarily described herein with reference to components of FIGS. 1-3 and associated arrangement of these components. However, the example process 1500 is not limited to the components of FIGS. 1-3.

At block 1505, the image capture component 110 is provided. At block 1510, the optical components 105 are formed. The optical components 105 may include one or more lens elements. At block 1515, the lens element(s) are at least partially disposed within a lens barrel (e.g., 205 of FIGS. 2A-2B). In some aspects, the lens element(s) may have mating features to couple to corresponding mating features of the lens barrel. The image capture component 110 may be disposed within a housing of the infrared imaging device 100. The lens barrel may be coupled to the housing. For infrared applications, the lens elements may be formed from material that is transmissive in the 2-7 μm and/or 7-15 μm wavebands. In some aspects, the lens elements may include the lens elements 305 and 310 of FIG. 3. In some cases, at least one surface of the lens elements may be a freeform surface. In such cases, one or more freeform surfaces may be formed from lens material, such that portions of the lens material are removed to define the desired freeform surface(s).

Formation of surfaces, such as freeform surfaces, to obtain the lens elements may be an iterative process. Trajectories of ray bundles may be analyzed, such as by determining associated ray transfer matrices, and appropriate adjustment to a remaining portion of the lens material may be performed. For example, the remaining portion of the lens material may be truncated based on analyzing the trajectories. In some cases, portions of the lens material that are truncated may include portions of the lens material through which no light passes. Such portions of the lens material may add bulk (e.g., and thus take up space) without performing imaging.

In one case, the lens elements 305 and 310, may be produced using wafer-level techniques. In such cases, transmissive crystalline material, such as germanium or silicon by way of non-limiting examples, may first be prepared in a wafer form. An array of lens elements (e.g., identical lens elements) may be diamond turned on one or two sides of the wafer. Machining of the array of lens elements may be on one or two sides of a wafer. In some cases, one or more mating features on a surface of a lens element can be located (e.g., using pattern recognition to scan the surface) to facilitate machining of a different surface of the lens element according to a desired design (e.g., freeform surface design). Lens elements formed as part of a wafer-level procedure may then be singulated to obtain individual lens elements that can be disposed in imaging devices. In a case that the lens elements 305 and 310 are different, the lens elements 305 and 310 may be formed as part of one wafer-level procedure (e.g., a wafer-level procedure that can be used to obtain differently shaped and/or sized lens elements) or two separate wafer-level procedures.

In one case, the lens elements 305 and 310 may be made of amorphous material. Examples of the material may include $As_{40}Se_{60}$ and GeAsSe glass. In some cases, the lens elements 305 and 310 may be diamond turned from disk-like preforms, diamond turned from near to shape ground preforms, molded from spherical performs, or molded from disk-like preforms using precision glass molding (PGM) technique. In some cases, an array of lenses can be molded simultaneously on a disk of glass.

Figure 16:
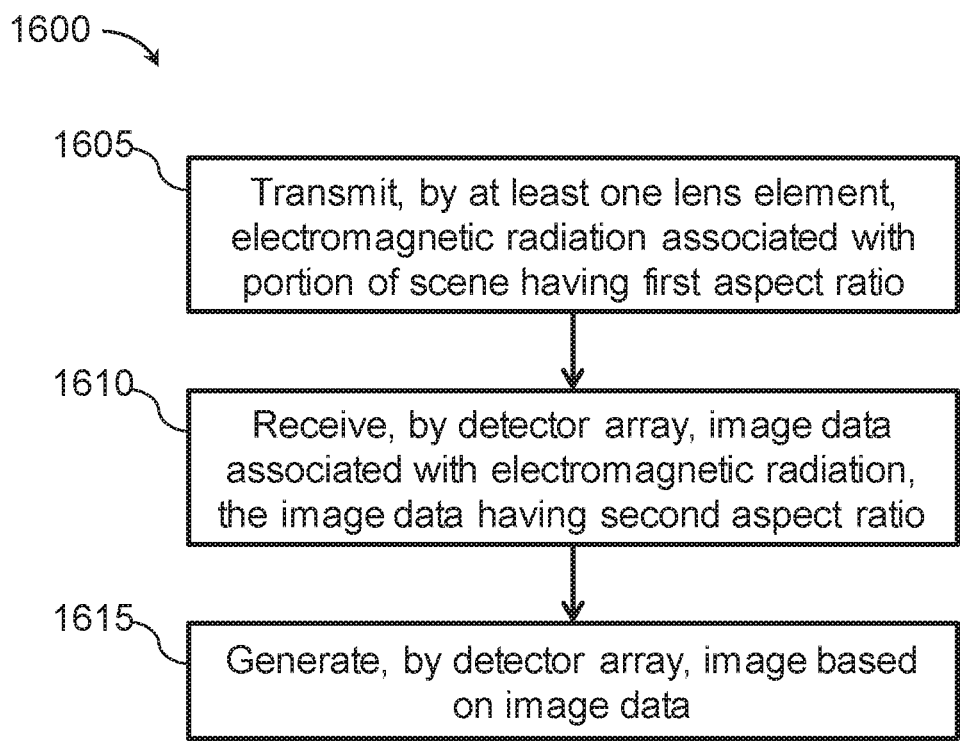
FIG. 16 illustrates a flow diagram of an example process for using an infrared imaging device in accordance with one or more embodiments of the disclosure.

FIG. 16 illustrates a flow diagram of an example process 1600 for using an infrared imaging device in accordance with one or more embodiments of the disclosure. For explanatory purposes, the example process 1600 is primarily described herein with reference to components of FIGS. 1-3 and associated arrangement of these components. However, the example process 1600 is not limited to the components of FIGS. 1-3. At block 1605, the lens elements 305 and 310 transmits EM radiation associated with the scene 320 having a first aspect ratio. At block 1610, the detector array 315 receives image data having a second aspect ratio different from the first aspect ratio. At block 1615, the detector array generates the image 325 based on the received image data. In some cases, the image 325 generated by the detector array 315 may be provided for processing, storage, and/or display. For example, the image 325 may be provided to a processor for processing to remove distortion in the image 325, and the processed image may then be provided for storage, display, and/or further processing.

Although the foregoing provides a two lens system, one lens element or more than two lens elements may be utilized. In some cases, each additional lens element provided in the system allows more degrees of freedom with regard to characteristics (e.g., shape such as curvature, size) defined for each of the lens elements to achieve a desired performance. Fewer number of lens elements is generally associated with a smaller size associated with the optical system. For instance, manufacturing limitations may constrain a maximum curvature that can be manufactured for a given lens element.

It is noted that dimensional aspects provided above are examples and that other values for the dimensions can be utilized in accordance with one or more implementations. Furthermore, the dimensional aspects provided above are generally nominal values. As would be appreciated by a person skilled in the art, each dimensional aspect has a tolerance associated with the dimensional aspect. Similarly, aspects related to distances between features also have associated tolerances.

Terms such as "top", "bottom", "front", "rear", "side", "horizontal", "vertical", and the like refer to an arbitrary frame of reference, rather than to the ordinary gravitational frame of reference. Thus, such a term may extend upwardly, downwardly, diagonally, or horizontally in a gravitational frame of reference.

Where applicable, various embodiments provided by the present disclosure can be implemented using hardware, software, or combinations of hardware and software. Also where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as program code and/or data, can be stored on one or more computer readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

Embodiments described above illustrate but do not limit the invention. It should also be understood that numerous modifications and variations are possible in accordance with the principles of the present invention. Accordingly, the scope of the invention is defined only by the following claims.

What is claimed is:

1. An infrared imaging device comprising:
    at least one lens element configured to transmit electromagnetic radiation associated with a portion of a scene, wherein the portion of the scene has a first aspect ratio, wherein the electromagnetic radiation comprises mid-wave infrared light and/or long-wave infrared light, wherein the at least one lens element has a freeform surface having no translational symmetry and no rotational symmetry, and wherein the at least one lens element comprises:
        a first lens element configured to receive the electromagnetic radiation and transmit the electromagnetic radiation, wherein the first lens element comprises a first surface facing the scene and a second surface opposite the first surface; and
        a second lens element configured to receive the electromagnetic radiation from the first lens element and transmit the electromagnetic radiation as image data, wherein the second lens element comprises a third surface facing the second surface of the first lens element and a fourth surface opposite the third surface, and wherein at least one of the first surface, the second surface, the third surface, or the fourth surface is a freeform surface; and
    a detector array configured to receive the image data associated with the electromagnetic radiation from the at least one lens element and generate, based on the image data, an image, wherein the fourth surface faces the detector array, wherein the image data has a second aspect ratio different from the first aspect ratio, and wherein each of the first aspect ratio and the second aspect ratio is a ratio of a size along a first direction and a size along a second direction orthogonal to the first direction.

2. The infrared imaging device of claim 1, wherein the first lens element comprises at least one mating feature configured to couple the first lens element to a lens barrel of the infrared imaging device.

3. The infrared imaging device of claim 2, further comprising the lens barrel, wherein the at least one mating feature of the first lens element is coupled to a corresponding mating feature of the lens barrel, and wherein the first lens element is configured to be rotatable.

4. The infrared imaging device of claim 1, further comprising a limiting aperture adjacent to the first surface of the first lens element, wherein the first lens element comprises a refractive lens element transmissive to light having a wavelength within a mid-wave infrared spectrum and/or a long-wave infrared spectrum, wherein at least one surface of the refractive lens element is a freeform surface having no translational symmetry and no rotational symmetry, and wherein the at least one freeform surface comprises a diffractive surface to facilitate correction of chromatic aberrations.

5. The infrared imaging device of claim 1, further comprising a limiting aperture adjacent to the first surface of the first lens element.

6. The infrared imaging device of claim 1, wherein the first aspect ratio is 3:1, wherein the second aspect ratio is 4:3 or 5:4, and wherein the detector array comprises an array of microbolometers.

7. The infrared imaging device of claim 1, further comprising a processor configured to process the image to remove non-uniform distortion to obtain a processed image.

8. The infrared imaging device of claim 1, further comprising:
    a housing; and
    a lens barrel comprising the first lens element and the second lens element, wherein the lens barrel is coupled to the housing, and wherein a portion of the lens barrel in front of the first lens element defines a limiting aperture of the infrared imaging device.

9. A method of manufacturing the infrared imaging device of claim 8, the method comprising:
    providing the detector array;
    forming the at least one lens element at least by removing a first portion of lens material to form one or more freeform surfaces;
    disposing the at least one lens element at least partially within the lens barrel; and
    disposing the detector array within the housing.

10. The method of claim 9, wherein at least one of the one or more freeform surfaces comprises a mating feature.

11. The method of claim 9, wherein the forming the at least one lens element is further by:
    determining a ray transfer matrix associated with the one or more freeform surfaces; and
    truncating to remove at least a second portion of the lens material to obtain the at least one lens element.

12. The method of claim 9, wherein the at least one lens element is formed as part of a wafer-level procedure that forms an array of lens elements, wherein the array of lens elements is machined on one or two sides of a wafer, and wherein machining of a first side of the wafer is based at least on a mating feature on a second side of the wafer.

13. The method of claim 9, wherein the at least one lens element is formed using precision glass molding.

14. The infrared imaging device of claim 1, wherein the first surface is a first freeform surface, and wherein the second surface is a second freeform surface opposite the first freeform surface.

15. A method comprising:
    transmitting, by a first lens element, electromagnetic radiation associated with a portion of a scene, wherein the first lens element comprises a first surface facing the scene and a second surface opposite the first surface, wherein the portion of the scene has a first aspect ratio, and wherein the electromagnetic radiation comprises mid-wave infrared light and/or long-wave infrared light;
    receiving, by a second lens element, the electromagnetic radiation from the first lens element;
    transmitting, by the second lens element, the electromagnetic radiation as image data onto a detector array, wherein the second lens element comprises a third surface facing the second surface of the first lens element and a fourth surface opposite the third surface, wherein the fourth surface faces the detector array, and wherein at least one of the first surface, the second surface, the third surface, or the fourth surface is a freeform surface having no translational symmetry and no rotational symmetry;

receiving, by the detector array from the second lens element, the image data associated with the electromagnetic radiation, wherein the image data has a second aspect ratio different from the first aspect ratio, wherein each of the first aspect ratio and the second aspect ratio is a ratio of a size along a first direction and a size along a second direction orthogonal to the first direction; and generating, by the detector array, an image based on the image data.

16. The method of claim 15, wherein the transmitting, by the first lens element, the electromagnetic radiation comprises refracting, by the first lens element, the electromagnetic radiation toward the detector array.

17. The method of claim 15, further comprising moving the first lens element along an axis associated with a third direction that is orthogonal to the first and second directions to adjust focus of the first lens element.

18. A method comprising:

moving at least one lens element along an axis associated with a first direction that is orthogonal to a second direction and a third direction to adjust focus of the at least one lens element, wherein a rotation about the axis is constrained within an alignment tolerance between a first field of view of the at least one lens element and a first dimension of a detector array and/or constrained within an alignment tolerance between a second field of view of the at least one lens element and a second dimension of the detector array, wherein the first dimension is parallel with the second direction, and wherein the second dimension is parallel with the third direction;

transmitting, by the at least one lens element, electromagnetic radiation associated with a portion of a scene, wherein the portion of the scene has a first aspect ratio, and wherein the electromagnetic radiation comprises mid-wave infrared light and/or long-wave infrared light;

receiving, by the detector array, image data associated with the electromagnetic radiation, wherein the image data has a second aspect ratio different from the first aspect ratio, wherein each of the first aspect ratio and the second aspect ratio is a ratio of a size along the second direction and a size along the third direction; and generating, by the detector array, an image based on the image data.

19. The method of claim 15, further comprising processing the image to remove non-uniform distortion to obtain a processed image.

20. The method of claim 18, wherein the first aspect ratio is 3:1 and/or wherein the second aspect ratio is 4:3 or 5:4.

* * * * *

UNITED STATES PATENT AND TRADEMARK OFFICE
CERTIFICATE OF CORRECTION

| | | |
|---|---|---|
| PATENT NO. | : 11,982,797 B2 | Page 1 of 1 |
| APPLICATION NO. | : 17/607757 | |
| DATED | : May 14, 2024 | |
| INVENTOR(S) | : Michael D. Walters, Alan Kathman and David Ovrutsky | |

It is certified that error appears in the above-identified patent and that said Letters Patent is hereby corrected as shown below:

In the Claims

Claim 4, Column 15, Line 65, change "one freedom surface comprises a" to --one surface comprises a--

Signed and Sealed this
Second Day of July, 2024

Katherine Kelly Vidal
*Director of the United States Patent and Trademark Office*